June 28, 1960  L. M. CAMPANI  2,942,467
LIQUID WEIGHT GAUGING APPARATUS
Filed Dec. 5, 1952
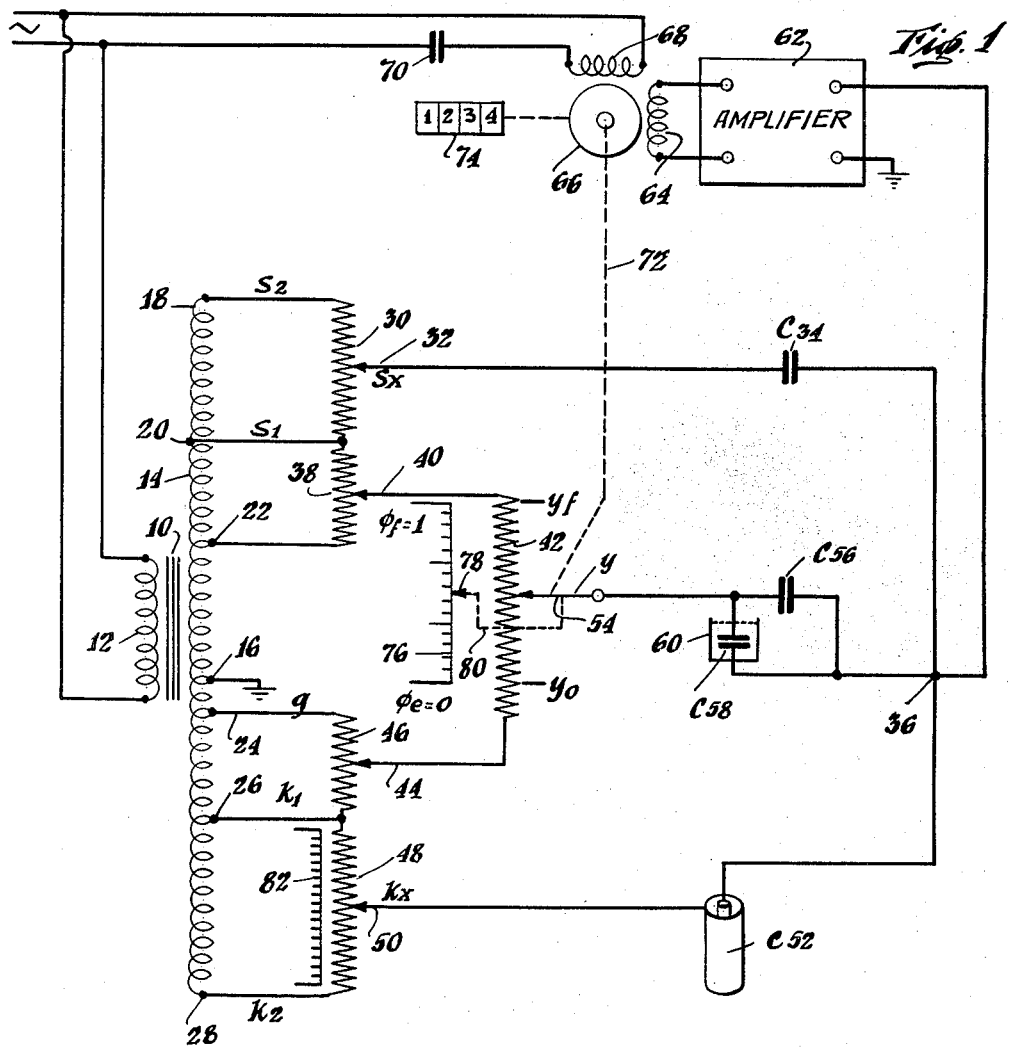
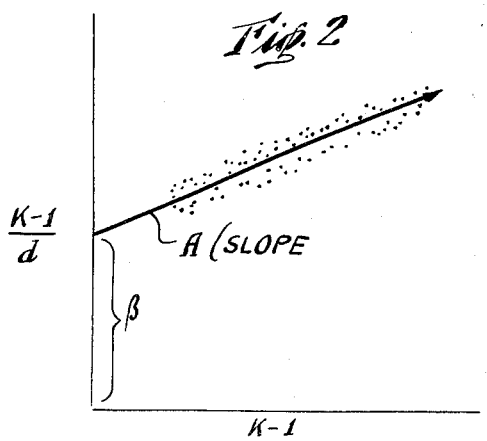
INVENTOR
*Louis M. Campani*
BY *Robert S. Dunham*
ATTORNEY

United States Patent Office 2,942,467
Patented June 28, 1960

2,942,467
LIQUID WEIGHT GAUGING APPARATUS

Louis M. Campani, Freeport, N.Y., assignor to The Liquidometer Corporation, Long Island City, N.Y., a corporation of Delaware Filed Dec. 5, 1952, Ser. No. 324,288

13 Claims. (Cl. 73—304)

This invention relates to the measurement of amounts of liquid in a tank and particularly relates to gauges of the capacitance type having an indicator that denotes the weight of a liquid fuel supply contained in a tank. This invention is an improvement on the invention described in the copending application of Carl G. Sontheimer and John R. Yoder, Serial No. 177,574, filed August 4, 1950.

As set forth in the above-identified application, such capacitance type gauges measure the electrical capacity of two or more spaced plates or electrodes positioned vertically in a fuel tank. The capacitance of the condenser formed by these plates or electrodes depends upon the amount of liquid disposed between the plates and, thus, is a function of the level of the fuel in the tank. This is because the capacitance of a condenser is a function of the dielectric constant of the material disposed between its plates. Gasoline, for example, has a dielectric constant of approximately two, relative to that of air, so that if the air between the plates of the measuring condenser is replaced by gasoline, the capacitance of the condenser will be increased to approximately twice its original value. If the air between the condenser plates is only partially replaced by the gasoline, the measuring condenser will have a proportionate intermediate value of capacitance.

In connection with the measurement of fuel quantity, in aircraft tanks, it is desirable to know the weight of the fuel rather than its volume, since weight is a more convenient and indicative measure of the energy available in the remaining fuel supply. Consequently, it is highly desirable that the readings of the fuel supply weight indicators be unaffected by changes in the volume of the fuel supply, resulting, for example, from changes in temperature.

In the copending application referred to above, it was noted that in certain classes of liquids a relationship exists between the dielectric constant and density, and the gauge disclosed therein made use of this relationship to provide an indication directly in terms of weight of fuel by determining the density electrically from the dielectric constant. In the practice of the invention disclosed in the above-identified copending application, an electrical quantity was created which was such a function of the dielectric constant that when injected into the measuring network, its compensating effect permitted the indicator to be calibrated to read directly in weight of fuel, thus obviating the necessity of making corrections for temperature, recalibration upon replenishment of the fuel supply, and the provision of extra apparatus for measuring the density of the fuel.

The system described in the above-identified copending application, while very satisfactory in operation, is subject to the disadvantage that the circuit constants for the power unit must usually be changed when used in different applications. This condition is brought about by the fact that the design of a fuel gauging system usually starts with the measuring capacitor, which capacitor must necessarily be designed to suit the particular tank in which it is to operate; and such tanks, particularly in aircraft, vary widely both in shape and size. In gauges of this type, it is also desirable that the measuring condensers be designed to provide a linear response, i.e., the capacitance at any given fuel level is proportional to the volume contained within the tank at that level. This requirement, coupled with the additional requirement that in many cases more than one measuring capacitor must be used either in a single tank or to totalize the contents of several tanks, makes it obvious to those skilled in the art, that in various installations the effective electric capacity of the measuring condenser will vary over relatively wide limits. This variation in design of the measuring condenser resulting from diversity of use necessitates corresponding variation in the other associated circuit elements. For example, if the system is used for fuel gauging in a pursuit type plane, the necessary power unit would employ a particular set of circuit constants, while if the system were in a bomber installation, a different set of circuit constants would be required.

In large scale commercial practice, these limitations result in important manufacturing and service disadvantages. An analysis of the manufacturing considerations shows that the delay in establishment of the circuit constants for the power unit pending design of both the fuel tank system and measuring condensers precludes early manufacture and necessary stocking of equipment and results in undesirable restrictions of a production schedule.

Apart from manufacturing disadvantages, field servicing of existing units raises problems that are perhaps even more serious than those attendant the manufacturing of the units in question. In field servicing, field depots are usually required to service many different types of aircraft. Considering that many types of aircraft are in use and also the fact that on any given aircraft there may be any number of gauging systems, it is obvious that many different types of power units will have to be duplicated, for in operation they are not universally interchangeable. Thus service depots necessarily stock the required spare parts for each type of system which, apart from being expensive, necessarily complicates the related records and servicing operations.

In the past, attempts have been made to minimize these disadvantages by mounting the variable portions of the various circuits as a separate unit or by making available plug-in units for various installations. These have not been entirely satisfactory, for even though the variable units are somewhat reduced in size, the problems of individual servicing and the stocking of an unduly large number of parts is still present. In other systems, efforts at interchangeability have been made by attempting to adapt the system, through a suitable range switch, to a number of fixed and predetermined conditions. However, such systems cannot be said to be universal in application and are not practicable for compensated gauges of the type described in the above-identified copending application.

As mentioned in the above identified copending application, it is known that in certain classes of liquids a relationship exists between the dielectric constant and the density. It has been found, for example, that for aviation gasoline, an empirical equation closely approximating the relationship is of the form $$\frac{(K-1)}{d} = A(K-1) + B \qquad (1)$$

where K is the ratio of the dielectric constant of the liquid to the dielectric constant of air, d is the ratio of the density of the liquid to the density of water, and A and B are constants. This relationship holds throughout a wide temperature range and is reasonably accurate for a wide number of fuels.

In the practice of the present invention, the above-described relationship is utilized and an electrical circuit is provided which renders the power unit for the gauging system interchangeable for different installations in which the capacity of the measuring capacitor varies within relatively wide limits. Thus by the practice of this invention, a universal power unit is provided that can be used on many different and diverse installations, the measuring capacitors of which come within a predetermined design range, by merely making a simple adjustment, which adjustment is determined by the capacitive value of the measuring condenser adapted to be immersed in the fuel for obtaining the desired indications.

Other advantages, objects and aspects of the present invention will be in part apparent from and in part pointed out in the following description of the invention and in the explanation of principles of operation thereof, considered in conjunction with the accompanying drawings in which:

Fig. 1 is a circuit diagram of the presently preferred embodiment of the electrical network of a measuring system embodying the invention; and Fig. 2 is a graph showing the ideal relationship between the dielectric constant and the density of a representative group of fuels being gauged as plotted in terms of the capacity index $$\frac{K-1}{d} \text{ and } K-1$$

In the presently preferred embodiment illustrated in Fig. 1, reference to which is made in order to explain the principles of the present invention, there is provided a transformer 10 having a primary winding 12 connected to a source of alternating current and a secondary winding 14. The secondary winding 14 of transformer 10 is grounded, as at 16 to provide a network reference point which in the present instance is represented by ground, and is tapped at predetermined points such as 18, 20, 22, 24, 26 and 28. Connected between taps 18 and 20 is a potentiometer 30. The sliding contact 32 of said potentiometer 30 is connected to one side of a capacitor $C_{34}$, the opposite side of which is connected to the network common junction point 36. The sliding contact 32 will have a voltage "$S_x$" at its terminal, which may vary from "$S_1$" to "$S_2$" depending upon its adjustment and setting.

Disposed between taps 20 and 22 is a potentiometer 38. The sliding contact 40 of said potentiometer 38 is connected to one end of a potentiometer 42. The other end of the potentiometer 42 is connected to the sliding contact 44 of a potentiometer 46 connected across taps 24 and 26 of the secondary winding 14.

The potentiometers 38 and 46 permit the "Empty" and "Full" adjustments for the system respectively. That is, the potentiometer 38 is used to set the indicator 74 to read correctly when the tank is empty and the potentiometer 46 is provided to permit setting the indicator 74 to read correctly the total weight of fuel in the tank when the tank is full.

Disposed between taps 26 and 28 of secondary 14 is a potentiometer 48. The sliding contact 50 of potentiometer 48 is connected to one side of a tank or measuring capacitor $C_{52}$, the other side of which is connected to the common junction point 36. The sliding contact 50 will have a voltage "$k_x$" at its terminal which may vary from "$k_1$" to "$k_2$" depending upon its adjustment and setting.

The potentiometer 42 is provided with a sliding contact 54 connected to the common junction point 36 through the parallel combination of a fixed condenser $C_{56}$ and a reference condenser $C_{58}$. Condenser $C_{58}$ is adapted to be immersed in the fuel being gauged or in a representative sample thereof as schematically shown at 60 so that the air dielectric will be replaced by the dielectric of the fuel.

The sliding contact 54 will have a voltage y at its terminal, the particular value of which will be determined by the setting of sliding contact 54. Associated with the potentiometer 42 is an indicating scale 76 having a marker element such as 78 connected, as indicated by the broken line 80, to the sliding contact 54 so as to indicate on the scale 76 the setting of the contact 54. The possible adjustment of the sliding contact 54 on the potentiometer 42 is so arranged and limited, as indicated by the position of the scale 76 on the drawing with respect to that of the ground tap 16, that the phase of the potential available at the tap 54 will always be the same as the phase of the potential available at the tap 32 of potentiometer 30. In this way the phase of the potential supplied to the common junction point 36 from the first circuit branch including condenser $C_{34}$ will always be substantially the same as the phase of the potential supplied to the point 36 through the third circuit branch including condensers $C_{58}$ and $C_{56}$.

The arrangement of the capacitive elements above described form a compensating network of the general type described in the previously identified copending application for modification of the response of the system as a function of weight of fuel based upon the general relationship between the dielectric constant and the density of the fuels being gauged.

In a system of this nature, and as described completely in the previously identified copending application, the setting of the sliding contact of the potentiometer connected to the parallel combination of capacitors such as $C_{56}$ and $C_{58}$ at balance condition for the network is proportional to the weight of fuel contained within the tank.

In order automatically to rebalance the network and thus automatically maintain the network in balance condition, the output of the measuring network at junction point 36 is connected to the input circuit of an amplifier 62. The output circuit of the amplifier 62 is connected across one field winding 64 of a reversible two phase electric motor, generally indicated at 66, the other field winding 68 of which is connected through a phase shifting condenser 70 to the alternating current supply, which is also connected to the primary 12 of the transformer 10.

The motor 66 is connected, by suitable reduction gearing or other means indicated diagrammatically by the broken line 72, to the sliding contact 54 of potentiometer 42, and is arranged to rotate in such a direction as to reduce the unbalance voltage appearing at the network common junction point 36. The motor 66 may also be arranged to drive a counter type indicator 74 that is suitably calibrated in terms of weight of the fuel in the tank. This rebalancing mechanism may be identical with that described in copending application Serial No. 166,898, filed June 8, 1950.

The tank or measuring capacitor $C_{52}$ which may be of the type described in the last mentioned copending application is normally designed to fit the particular requirements of the particular tank in which it is to be installed and the capacitance under any given set of conditions is determined by the general relationship $$C_{52}=C_{52e}[1+(K-1)X] \tag{2}$$

where K is the dielectric constant of the particular fuel being measured, $C_{52e}$ is the capacitance of the measuring condenser when the tank is empty, and X is a number between zero and unity denoting the proportionate part of the tank filled with fuel.

In a network of this general type, the current I through any impedance element of the value Z equals the product of the voltage V impressed across the impedance and the reciprocal of Z, which is termed the admittance of the impedance element, by definition. Thus, in the event that the impedance element is entirely of capacitive nature, its admittance will have a magnitude equal to $2\pi f C$, where $f$ is the impressed frequency and $C$ is the capacitance of the impedance element. Thus for this type of impedance element, the admittance is directly proportional to the capacitance.

Referring to the network illustrated in Fig. 1, it is apparent from conventional circuit theory that the balance equation for the system is $$(s_x)(2\pi f C_{34}) + (y)(2\pi f)(C_{56} + KC_{58}) = (k_x)(2\pi f C_{52}) \quad (3)$$

Simplifying the above expression and substituting Equation 2 therein provides $$s_x C_{34} + y(C_{56} + KC_{58}) = (k_x)(C_{52e}[1 + (K-1)X]) \quad (4)$$

and $$s_x C_{34} + y(C_{56} + KC_{58}) = k_x C_{52e} + k_x C_{52e} X(K-1) \quad (5)$$

where
$s_x$ = potential applied to $C_{34}$
$y$ = potential applied to $C_{56}$ and $C_{58}$
$k_x$ = potential applied to $C_{52}$
$X$ = proportionate part of tank filled with fuel
$C_{52}$ = capacitance of measuring condenser at any value $X$
$C_{52e}$ = capacitance of measuring condenser when tank is empty
$K$ = dielectric constant of the fuel As a design factor, and neglecting stray capacitance so as not needlessly to complicate the explanation, it is possible to establish the following equality $$s_x C_{34} = k_x C_{52e} \quad (6)$$

The introduction of this equality in Equation 5 results in reducing that equation as follows:

$$y(C_{56} + KC_{58}) = k_x C_{52e} X(K-1) \quad (7)$$

From the geometry between the voltages applied to the balancing potentiometer 42 and the indicating scale 76, the following relation may be established:

$$\frac{y}{\phi} = \frac{y_t}{\phi_f} = \frac{y_t}{1} \quad (8)$$

where
$y$ = potential applied to $C_{56}$ and $C_{58}$
$\phi$ = indicator scale indication for any voltage $y$
$y_t$ = potential applied to $C_{56}$ and $C_{58}$ at "Full"
$\phi_f$ = indicator scale indication at "Full" = 1

Substituting Equation 8 in Equation 7 provides:

$$\phi = \frac{k_x X}{y_t} \cdot \frac{C_{52e}(K-1)}{C_{56} + KC_{58}} \quad (9)$$

However, it is required that the system provide a weight indication, that is, volume multiplied by density. This may conveniently be expressed as $$\phi = \frac{d}{d_{max}} \cdot X \quad (10)$$

where
$d$ = any density within the design range
$d_{max}$ = maximum density of the design range Now equating Equations 9 and 10, there is obtained:

$$C_{56} + KC_{58} = \frac{k_x d_{max}}{y_t} \cdot C_{52e} \cdot \frac{K-1}{d} \quad (11)$$

Referring now to Fig. 2, the illustrated graph shows the ideal relationship between the dielectric constant and the density of a group of fuels as plotted in terms of the capacity index $$\frac{K-1}{d} \text{ and } K-1$$

The graph represents the equation of the best straight line passing through the plotted characteristics of the fuels being gauged. From Fig. 2 it is readily apparent that:

$$\frac{K-1}{d} = A(K-1) + B \quad (12)$$

where
$A$ = the slope of the line
$B$ = the intercept of the line

Substituting Equation 12 in Equation 11 provides:

$$C_{56} + KC_{58} = \frac{k_x d_{max}}{y_t} \cdot C_{52e}[KA + (B-A)] \quad (13)$$

Equating similar coefficients in Equation 13 establishes the constants of the condenser elements of the compensating circuit as follows:

$$C_{56} = (B-A)(C_{52e})\left(\frac{k_x d_{max}}{y_t}\right) \quad (14)$$

$$C_{58} = (AC_{52e})\left(\frac{k_x d_{max}}{y_t}\right) \quad (15)$$

It will be apparent from examination of Equations 14 and 15 that a fixed ratio exists between fixed capacitor $C_{56}$ and the empty capacity of capacitor $C_{58}$ of the compensating circuit. This ratio is:

$$\frac{C_{56}}{C_{58}} = \frac{B-A}{A} \quad (16)$$

and clearly indicates that it is completely independent of the total electrical capacity of the measuring capacitor $C_{52}$ when no fuel is disposed between its plates, i.e. when it has a value $C_{52e}$. It therefore follows that if $C_{58}$ is fixed in value, $C_{56}$ will also be fixed and vice versa, that is:

$$C_{58} = \frac{A}{B-A} \cdot C_{56} = \text{constant} \quad (17)$$

This relationship indicates that a fixed value can be assigned to these two condenser elements of the compensating circuit and that these values are independent of the capacity of the measuring condenser $C_{52}$. From a practical viewpoint this permits the utilization of a fixed value of reference condenser (i.e. $C_{58}$, which is placed in the fuel to sense the dielectric constant of the fuel for purposes of measuring by weight) irrespective of the fact that the capacity of the measuring probe must necessarily change to suit diverse installations.

If Equations 17 and 15 are combined, the following relationship is established:

$$\frac{C_{56}}{B-A} = (C_{52e})\left(\frac{k_x d_{max}}{y_t}\right) \quad (18)$$

An inspection of Equation 18 shows that equality can be readily maintained if a change in measuring condenser capacity $C_{52e}$ can be compensated by a corresponding change in another element of the equation. This is readily seen by rewriting Equation 18 as follows:

$$(C_{52e})(k_x) = \left(\frac{C_{56}}{B-A}\right)\left(\frac{y_t}{d_{max}}\right) = \text{constant} \quad (19)$$

It is apparent that the term "$k_x$" representing the voltage applied to the measuring capacitor $C_{52}$ is the most convenient variable, and such variation is readily effected by positioning the sliding contact 50 of potentiometer 48. As all the terms on the right hand side of Equation 19 are constants, the disclosed system will operate satisfactorily as long as the products $C_{52e} k_x$ and $s_x C_{34}$ [see Equation 6] are arranged to be equal to each other and to the particular constant $$\left[\frac{C_{56}}{B-A} \cdot \frac{y_t}{d_{max}}\right]$$

The value of "$k_x$" can be conveniently varied by use of the potentiometer 48, so as the value of $C_{52e}$ varies in different installations, "$k_x$" may be correspondingly varied so as to maintain the desired constancy of the product thereof.

In a similar manner, potentiometer 30 and condenser $C_{34}$ are adjusted to the same particular constant. The setting of the latter potentiometer is readily effected as a factory adjustment, which is carefully preset and thus accommodates any manufacturing variations in condenser $C_{34}$ and in the source voltage "$s_x$."

By way of example, a practical set of operating values is illustrative of the wide range of operation permitted by the disclosed structure. If $$s_2 = +1.333 \text{ volts}$$
$$s_1 = +1.000 \text{ volt}$$
$$f = +0.871 \text{ volt}$$
$$g = -0.0114 \text{ volt}$$
$$k_1 = -0.014 \text{ volt}$$
$$k_2 = -2.000 \text{ volts}$$
$$y_t = +0.860 \text{ volt}$$

and the constants for the compensating circuit have been empirically determined for a given group of fuels having $d_{max} = 7.216$ to be $$B = 0.130$$
$$A = 0.037$$

and reference capacitor $C_{58}$ is fixed as 30 $\mu\mu f.$, the value of $C_{56}$ is determined by use of Equation 17

$$C_{56} = \frac{B-A}{A} \cdot C_{58} \quad (20)$$

$$= \left[\frac{.130 - .037}{.037}\right] 30 = 75.3 \ \mu\mu f.$$

and from Equation 19

$$C_{52e} k_x = \frac{75.3}{.130 - .037} \cdot \frac{0.860}{7.216} = 97.1 \quad (21)$$

Therefore if $$C_{52e} = \frac{97.1}{.014} = 692 \ \mu\mu f.$$

and if $$k_x = k_2 = 2.00$$

$$C_{52e} = \frac{97.1}{2} = 48.5 \ \mu\mu f.$$

It is therefore apparent that with the above example constants, the system is operable for use with tank or measuring capacitors ranging in value from 48.5 to 692 $\mu\mu f.$, a ratio of approximately 14 to 1. The above range of permitted capacitance values is usually ample to accommodate the design requirements for measuring capacitors adapted for a wide diversity of use and installation.

As a convenience in making the necessary range adjustments, a scale 82 is preferably associated with potentiometer 48, such, for example and utilizing the figures in the above illustrative example, that at "$k_1$," the scale would read 48.5 $\mu\mu f.$, and at "$k_2$" it would read 692 $\mu\mu f.$ with the intermediate points suitably graduated. This permits the rapid adaptation of the unit to diverse application by merely setting the potentiometer 48 to correspond to the empty capacity of any particular measuring condenser $C_{52}$ and renders the equipment universally applicable to all measuring capacitors likely to be designed for this type service.

The components of the illustrated circuit may readily be physically located so that the power unit section may include transformer 10, potentiometers 30, 38, 46 and 48, condensers $C_{34}$ and $C_{56}$ and the amplifier 62. The indicator section may include motor 66, indicator 74 and balancing potentiometer 42 and may, if desired, be included in or adjacent to the power unit. Capacitors $C_{58}$ and $C_{52}$ may be installed as separate components or $C_{58}$ may be designed to be physically combined with $C_{52}$.

It is thus seen that there has been provided a simple and effective capacitance type gauge for determination of the weight of fuels in a tank that automatically makes use of the natural relationship between the dielectric constant and the density and which permits a degree of universality of use heretofore unknown through the utilization of an interchangeable power unit with diverse measuring capacitors having capacitances which vary over wide limits.

It will be observed that the illustrated circuit arrangement is well suited to attain the ends and objects hereinbefore set forth, but that the disclosure is not intended to be exhaustive of all the possible arrangements for application of the principles set forth herein, the illustrated embodiment and examples being given by way of illustration in accordance with the requirements of the statutes and not by way of limitation.

I claim:

1. A measuring system for determining the weight of a liquid in a tank, wherein a substantially predetermined relationship exists between the dielectric constant and the density of the liquid, comprising a first condenser, a network reference point serving as an electrical base for the network, a first adjustable source of alternating voltage with respect to the potential at said network reference point and of one phase for said first condenser and capable of being set as a set-up adjustment which may thereafter be fixed, so that the product of the voltage from said first source of voltage with respect to the potential at said reference point and the capacitance of said first condenser is equal to a predetermined constant value, first circuit means connecting said first condenser intermediate said first source of voltage and a common circuit terminal, so as to produce at said common circuit terminal a signal of a first phase; a second condenser having a capacitance that is a predetermined function of the volume and of the dielectric constant of the liquid being measured, a second adjustable source of alternating voltage with respect to the potential at said network reference point and of another phase for said second condenser capable of being set so that the product of the voltage from said second source of voltage with respect to the potential at said reference point and the capacitance of said second condenser when the dielectric thereof has a value of unity is equal to said predetermined constant value, second circuit means connecting said second condenser intermediate said second source of voltage and said common circuit terminal, so as to produce at said common circuit terminal a signal of a second phase; a third condenser having a capacitance that is a predetermined function of said predetermined relationship between the dielectric constant and the density of the liquid, a third adjustable source of alternating voltage with respect to the potential at said network reference point and of said one phase for said third condenser, third circuit means connecting said third condenser intermediate said third source of voltage and said common circuit terminal, so as to produce at said common circuit terminal a signal also of said first phase; circuit means connecting all said sources of alternating voltage and providing a second common circuit terminal for the system constituted by said network reference point; and means for balancing the output of said condensers by balancing the resultant of said signals of said first phase and said signal of said second phase to a condition of zero potential between said circuit terminals by adjustment of the voltage of said third source of voltage, the adjusted balance value of said third source of voltage with respect to the potential at said reference point being indicative of the weight of the liquid in the tank which is being measured.

2. The measuring system according to claim 1, wherein said adjustable sources of alternating voltage are potentiometers.

3. The measuring system according to claim 1, wherein said third condenser has spaced plates immersed in a representative sample of the liquid being measured.

4. A measuring system for determining the weight of a liquid in a tank, wherein a substantially predetermined relationship exists between the dielectric constant and the density of the liquid, comprising a measuring point, a first condenser connected to said measuring point, a network reference point serving as an electrical base for the network, a first adjustable source of alternating voltage with respect to the potential at said network reference point and of one phase connected to said first condenser and capable of being set as a set-up adjustment which may thereafter be fixed so that the product of the voltage from said first source of voltage with respect to the potential at said network reference point and the capacitance of said first condenser is equal to a predetermined constant value and produces at said measuring point a signal of a first phase; a second condenser connected to said measuring point and having a capacitance that is a predetermined function of the volume and of the dielectric constant of the liquid being measured, a second adjustable source of alternating voltage with respect to the potential at said network reference point and of another phase connected to said second condenser and capable of being set so that the product of the voltage from said second source of voltage with respect to the potential at said network reference point and the capacitance of said second condenser when the dielectric has a value of unity is equal to said predetermined constant value and produces at said measuring point a signal of a second phase; a third condenser immersed in a representative sample of the liquid being measured and having a capacitance that is a predetermined function of said fixed relationship between the dielectric constant and the density of the liquid, a fourth condenser, a third adjustable source of alternating voltage with respect to the potential at said network reference point and of said one phase, circuit means connecting said third and said fourth condensers, which are connected in parallel with each other, intermediate said third source of voltage and said measuring point, so as to produce at said measuring point a signal which is also of said first phase; and circuit means connected to said measuring point and responsive to unbalanced voltage between said point and said network reference point and corresponding to a resultant of the signals of said first phase and the signal of said second phase for balancing the output of said condensers by adjustment of the voltage of said third source of voltage with respect to the potential at said network reference point, the adjusted balance value of said third source of voltage with respect to the potential at said network reference point being indicative of the weight of the liquid in the tank which is being measured.

5. A measuring system for determining the weight of a liquid in a tank, wherein a substantially predetermined relationship exists between the dielectric constant and the density of the liquid such that $$\frac{K-1}{d}=A(K-1)+B$$

where "K" is the dielectric constant of the liquid, "d" is its density, and "A" and "B" are constants, comprising a first condenser, a network reference point serving as an electrical base for the network, a first adjustable source of alternating voltage with respect to the potential at said network reference point and of one phase for said first condenser capable of being set as a set-up adjustment which may thereafter be fixed, so that the product of the voltage from said first source of voltage with respect to the potential at said reference point and the capacitance of said first condenser is equal to a predetermined constant value, first circuit means connecting said first condenser intermediate said first source of voltage and a common circuit terminal, so as to produce at said common circuit terminal a signal of a first phase; a second condenser having a capacitance that is a predetermined function of the volume and of the dielectric constant of the liquid being measured, a second adjustable source of alternating voltage with respect to the potential at said network reference point and of another phase for said second condenser capable of being set so that the product of the voltage from said second source of voltage with respect to the potential at said reference point and the capacitance of said second condenser when the dielectric thereof has a value of unity is equal to said predetermined constant value, second circuit means connecting said second condenser intermediate said second source of voltage and said common circuit terminal, so as to produce at said common circuit terminal a signal of a second phase; a third condenser immersed in a representative sample of the liquid being measured and having a capacitance that is a predetermined function of said fixed relationship between the dielectric constant and the density of the liquid, a fourth condenser connected in parallel with said third condenser, a third adjustable source of alternating voltage with respect to the potential at said network reference point and of said one phase for said third and fourth condensers, third circuit means connecting said third and fourth condensers intermediate said third source of voltage and said common circuit terminal, so as to produce at said common circuit terminal a signal also of said first phase; circuit means connecting all said sources of alternating voltage and providing a second common circuit terminal for the system constituted by said network reference point; and means for balancing the output of said condensers by balancing the resultant of said signals of said first phase and said signal of said second phase to a condition of zero potential between said circuit terminals by adjustment of the voltage of said third source of voltage with respect to the potential at said reference point, the adjusted balance value of said third source of voltage with respect to the potential at said reference point being indicative of the weight of the liquid in the tank which is being measured.

6. A measuring system according to claim 1, wherein each of said adjustable sources of alternating voltage comprises a potentiometer, wherein each of said potentiometers is connected across a predetermined portion of the secondary winding of a transformer, and wherein said second common circuit terminal constituting said network reference point is a predetermined point centrally of said secondary winding of said transformer.

7. The measuring system in accordance with claim 5, wherein the values of the capacitances of said third and fourth condensers bear a predetermined relationship to each other, said relationship being a predetermined function of the values of the constants "A" and "B."

8. The measuring system in accordance with claim 5 wherein said predetermined constant value is equal to $$\left[\frac{C}{B-A}\cdot\frac{y_f}{d_{max}}\right]$$

where "C" is the capacitance of the fourth condenser, "$y_f$" is the voltage of said third voltage source at "Full," and "$d_{max}$" is the maximum density of the liquids being measured.

9. A measuring system for determining the weight of a liquid in a tank, wherein a substantially predetermined relationship exists between the dielectric constant and the density of the liquid such that $$\frac{K-1}{d}=A(K-1)+B$$

where "K" is the dielectric constant of the liquid, "d" is its density, and "A" and "B" are constants, comprising a measuring point, a first condenser connected to said measuring point, a network reference point serving as an electrical base for the network, a first adjustable source of alternating voltage with respect to the potential at said network reference point and of one phase connected to said first condenser and capable of being set as a set-up adjustment which may thereafter be fixed, so that the product of the voltage from said first source of voltage with respect to the potential at said reference point and the capacitance of said first condenser is equal to a predetermined constant value, so as to produce at said measuring point a signal of a first phase; a second condenser connected to said measuring point and having a capacitance that is a predetermined function of the volume and of the dielectric constant of the liquid being measured, a second adjustable source of alternating voltage with respect to the potential at said network reference point and of another phase for said second condenser capable of being set so that the product of the voltage from said second source of voltage with respect to the potential at said reference point and the capacitance of said second condenser when the dielectric thereof has a value of unity is equal to said predetermined constant value, so as to produce at said measuring point a signal of a second phase; a third condenser connected to said measuring point, said third condenser being immersed in a representative sample of the liquid being measured and having a capacitance that is a predetermined function of said fixed relationship between the dielectric constant and the density of the liquid, a fourth condenser connected in parallel with said third condenser and to said measuring point and having a value equal to the product of $$\frac{B-A}{A}$$

and the capacitance of said third condenser when the dielectric thereof has a value of unity, a third adjustable source of alternating voltage with respect to the potential at said network reference point and of said one phase for said third and said fourth condensers, so as to produce at said measuring point a signal also of said first phase; and circuit means connected to said measuring point and responsive to the unbalance voltage at said point with respect to the potential at said reference point constituted by a resultant of said signals of said first phase and said signal of said second phase for balancing the output of said condensers by adjustment of the voltage of said third source of voltage with respect to the potential at said reference point, the adjusted balance value of said third source of voltage with respect to the potential at said reference point being indicative of the weight of the liquid in the tank which is being measured.

10. The measuring circuit in accordance with claim 9 wherein said predetermined constant value is equal to $$\left[\frac{C}{B-A} \cdot \frac{y_f}{d_{\max}}\right]$$

where "$C$" is the capacitance of the fourth condenser, "$y_f$" is the voltage of said third voltage source at "Full," and "$d_{\max}$" is the maximum density of the liquids being measured.

11. The measuring circuit in accordance with claim 9 wherein said third adjustable source of voltage is connected to fourth and fifth adjustable sources for alternating voltage for providing "Empty" and "Full" adjustments for the system, respectively.

12. A measuring system for determining the weight of a liquid in a tank, wherein a substantially predetermined relationship exists between the dielectric constant and the density of the liquid, comprising a transformer, the primary winding of which is adapted to be energized by an alternating current source, a predetermined point centrally of the secondary winding of said transformer constituting a network reference point and serving as an electrical base for the network, a first condenser, a first potentiometer extending between predetermined points on said secondary winding which are both on one side of said network reference point, a tap on said first potentiometer constituting a first adjustable source of alternating voltage with respect to the potential at said reference point, and wherein said tap on said first potentiometer is adapted to be set so that the product of the voltage from said first source of voltage with respect to the potential at said reference point and the capacitance of said first condenser is equal to a predetermined constant value, first circuit means connecting said first condenser intermediate said first source of voltage and a common circuit terminal, so as to produce at said common circuit terminal a signal of a first phase; a second potentiometer connected between predetermined points on said secondary winding which are both on the other side of said network reference point from the connections to said first potentiometer, a tap on said second potentiometer constituting a second adjustable source of alternating voltage with respect to the potential at said network reference point, a second condenser having a capacitance that is a predetermined function of the volume and of the dielectric constant of the liquid being measured, said tap on said second potentiometer being capable of being set so that the product of the voltage from said second source of voltage with respect to the potential at said network reference point and the capacitance of said second condenser when the dielectric thereof has a value of unity is equal to said predetermined constant value, second circuit means connecting said second condenser intermediate said second source of voltage and said common circuit terminal, so as to produce at said common circuit terminal a signal of a second phase; a third potentiometer connected between predetermined points on said secondary winding which are respectively on opposite sides of said network reference point, a tap on said third potentiometer constituting a third adjustable source of alternating voltage with respect to the potential at said network reference point and adapted to be adjusted only in such a manner that said third adjustable source of alternating voltage will always be of the same phase as that of said first adjustable source of alternating voltage, a third condenser having a capacitance that is a predetermined function of said predetermined relationship between the dielectric constant and the density of the liquid, third circuit means connecting said third condenser intermediate said tap on said third potentiometer and said common circuit terminal in a manner to produce at said common circuit terminal a signal also of said first phase; and means for balancing the output of said condensers by reducing the resultant of said signals of said first phase and said signal of said second phase to a condition of zero potential between said common circuit terminal and said network reference point by adjustment of the voltage of said third source of voltage, the adjusted balance value of said third source of voltage with respect to the potential at said network reference point being indicative of the weight of the liquid in the tank which is being measured.

13. A measuring system according to claim 12, comprising in addition, fourth and fifth potentiometers, each of which is connected across a portion of said secondary winding, said fourth potentiometer being connected across points both of which are on one side of said network reference point and said fifth potentiometer being connected across points both of which are on the other side of said network reference point, adjustable taps on said fourth and fifth potentiometers connected respectively to the ends of said third potentiometer, the adjustment of said taps on said fourth and fifth potentiometers constituting respectively means for adjusting the system for "full" and "empty" readings.

References Cited in the file of this patent

UNITED STATES PATENTS 2,563,281 Griffith _____ Aug. 7, 1951
2,581,085 Edelman _____ Jan. 1, 1952

UNITED STATES PATENT OFFICE

CERTIFICATE OF CORRECTION

Patent No. 2,942,467            June 28, 1960

Louis M. Campani

It is hereby certified that error appears in the printed specification of the above numbered patent requiring correction and that the said Letters Patent should read as corrected below.

Column 7, line 27, for "as" read -- at --; line 40, after "Therefore if" insert -- $k_x = k_1 = 0.014$ --; column 11, line 62, for "for" read -- of --.

Signed and sealed this 29th day of November 1960.

(SEAL)
Attest:

KARL H. AXLINE
Attesting Officer

ROBERT C. WATSON
Commissioner of Patents